United States Patent

Singh

[11] Patent Number: 6,154,660
[45] Date of Patent: Nov. 28, 2000

[54] CALLEE-BASED TELEPHONE LINE PRESELECTION

[75] Inventor: Mona Singh, Cary, N.C.

[73] Assignee: Ericsson Inc., Research Triangle Park, N.C.

[21] Appl. No.: 09/120,349

[22] Filed: Jul. 21, 1998

[51] Int. Cl.[7] .................................................. H04B 1/38
[52] U.S. Cl. ........................................ 455/550; 455/407
[58] Field of Search .................................. 455/553, 552, 455/564, 565, 432, 414, 403, 554, 406, 407; 379/157, 164, 165

[56] References Cited

U.S. PATENT DOCUMENTS

| | | | |
|---|---|---|---|
| 5,014,302 | 5/1991 | Kappeler et al. | 379/165 |
| 5,448,622 | 9/1995 | Huttunen | 379/59 |
| 5,493,693 | 2/1996 | Tanaka et al. | 455/33.1 |
| 5,590,185 | 12/1996 | Sandler et al. | 379/163 |
| 5,590,397 | 12/1996 | Kojima | 455/33.1 |
| 5,754,640 | 5/1998 | Sosnowski | 379/221 |
| 5,764,730 | 6/1998 | Rabe et al. | 379/58 |
| 5,765,110 | 6/1998 | Koizumi | 455/445 |
| 5,862,203 | 1/1999 | Wulkan et al. | 379/114 |
| 5,950,138 | 9/1999 | Norimatsu | 455/550 |

FOREIGN PATENT DOCUMENTS

| | | |
|---|---|---|
| 0 526 981 A2 | 2/1993 | European Pat. Off. . |
| 2 296 409 | 6/1996 | United Kingdom . |
| WO 97/40638 | 10/1997 | WIPO . |
| WO 98/53629 | 11/1998 | WIPO . |
| 99/12386 | 10/1999 | WIPO . |

*Primary Examiner*—Edward F. Urban
*Assistant Examiner*—Congvan Tran
*Attorney, Agent, or Firm*—Jenkens & Gilchrist, P.C.

[57] ABSTRACT

A telecommunications device includes a first telephone line enabling access to a telecommunications network and a second telephone line enabling access to a telecommunications network. A selection apparatus is included which in response to an entered outgoing call number and a user generated input enables selection of one of the first and second telephone lines for supporting a call connection between the telecommunications device and the outgoing called number over the telecommunications network.

12 Claims, 2 Drawing Sheets

CALLEE-BASED TELEPHONE LINE PRESELECTION

BACKGROUND OF THE INVENTION

1. Technical Field of the Invention

The present invention relates to telecommunication devices capable of utilizing multiple incoming telephone lines, and more particularly, to a method for preselecting the telephone lines to associate with a particular outgoing call number.

2. Description of Related Art

One of the new developments in the continuing evolution of wireless communication devices has been the creation of wireless communication units which are capable of having multiple calling numbers (telephone lines) associated therewith. Thus, calls may be made from the same communications unit using accounts associated with separate telephone numbers. While this is a very desirable and expected development in the usage of telecommunication devices, the availability of multiple phone lines in a single telecommunications unit poses a particular challenge. Namely, when several lines are available, how does a user select which telephone line to use. Some manner for preventing the user from being overwhelmed with choices is desired when they may be in a hurry to make a telephone call.

One potential solution involves the use of an auto select function which automatically selects the telephone line on which an outgoing call will be initiated from the telecommunications unit. A selection algorithm utilizes factors such as reliability to select which telephone line to use. Unfortunately, selection algorithms may not address all of the concerns a user may actually have when attempting to select a telephone line for use. An automatic approach substantially reduces the flexibility available to the user such that a naive user may select a line providing less desirable performance while more experienced users would be forced to disable an auto select function in order to tailor the phone to their desired needs.

Thus, due to the varied desires of telecommunication device users, it is virtually impossible to select a telephone line by any algorithm that meets all of a users calling needs. For example, a user may not wish to make a personal call from a telephone line paid for by his employer, or make a business call from a line for which he is personally billed. Additionally, a user may not wish to call a specific number from a telephone line on which he does not have caller ID blocking. Thus, some manner for providing users of multi-line telecommunication units to more flexibly control their outgoing calling line is desired.

SUMMARY OF THE INVENTION

The present invention overcomes the foregoing and other problems with an improved telecommunications device supporting user prompted selection between a number of outgoing telephone lines. The telecommunications device includes at least first and second outgoing telephone lines enabling access of the telecommunications device to a telecommunications network. The telecommunications device further includes circuitry enabling a user to select between an automated and a nonautomated mode of operation. In the automated mode of operation, the first or second telephone lines are selected automatically. In the nonautomated mode of operation, user generated input is utilized to select the outgoing telephone line.

The selection between the first and second outgoing telephone lines is achieved using a database associated with the telecommunications device. The database includes a listing of outgoing call numbers wherein each of the outgoing call numbers has a particular telephone line associated therewith. Thus, when a particular outgoing call number is entered, the database is searched and upon finding the outgoing call number, the call is made using the telephone line associated with the outgoing call number. The user creates the database listings through an interface of the telecommunications device.

In alternative embodiment, the telecommunications unit may be configured to utilize a particular telephone line upon entry of a called number unless the called number has a particular telephone line associated therewith in the database. Furthermore, rather than utilizing a database to select the telephone line for an outgoing call number, a user may be presented with a display of existing telephone lines and manually select one of the telephone lines.

BRIEF DESCRIPTION OF THE DRAWINGS

For a more complete understanding of the present invention, reference is made to the following Detailed Description taken in conjunction with the accompanying drawings wherein.

DETAILED DESCRIPTION OF THE INVENTION

Figure 1:
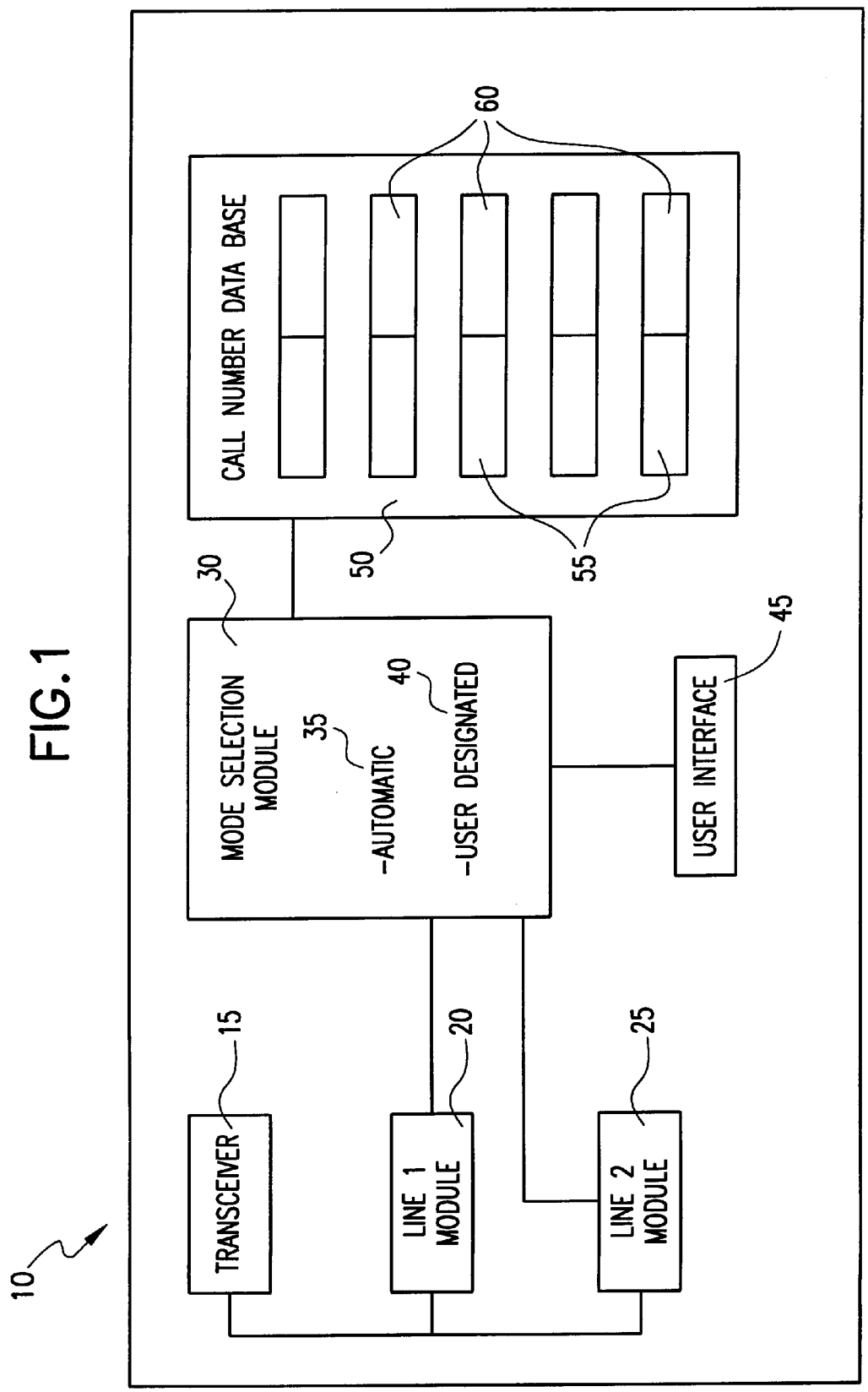
FIG. 1 is a block diagram of a telecommunications device incorporating the callee-based telephone line preselection function according to the present invention.

Referring now to the Drawings, and more particularly to FIG. 1, there is illustrated a block diagram of the telecommunications device 10 incorporating the callee-based telephone line preselection functionalities of the present invention. The telecommunications unit 10 can, in a preferred embodiment, comprise a wireless cellular communications device for communicating through a public land mobile network (PLMN). Alternatively, the present invention could be utilized within a wireline telephone unit operating within a public switch telephone network (PSTN). In the wireless telephone embodiment of the invention, the telecommunications unit 10 includes transceiver circuitry 15 for establishing a radio communications link with the PLMN network. In a wireline telecommunications unit 10 the transceiver would be substituted for a wireline interface (not shown) for interconnecting the telecommunications unit 10 with the PSTN network.

The telecommunications unit 10 includes a line 1 functionality module 20 and a line 2 functionality module 25 to enable the telecommunications unit 10 to interconnect with a PLMN network utilizing two separate telephone line interfaces. Each of the line 1 functionalities 20 and line 2 functionalities 25 would have a separate telephone number and billing account associated with each of them. Thus, a user would have the ability to call out over either of the telephone lines associated with the line 1 and line 2 functionalities 20, 25. It should be noted that any number of line functionality modules may be used depending on the number of lines supported by the telephone.

A mode selection module 30 enables a user to select operation of the telecommunications unit 10 in a variety of modes of operation. A user is able to select the particular mode of operation utilizing the user interface 45. In one embodiment, the mode selection module 30 may enable a user to select operation of the telecommunications unit in either an automatic mode of operation 35 or a user designated mode of operation 40. Under the automatic mode of operation, the selection of the phone line for an outgoing call is selected according to a selection algorithm (not shown) which automatically selects the line 1 or line 2 functionalities 20, 25 to use for the outgoing call. Alternatively, the selected mode of operation may enable the user to manually select the line 1 or line 2 functionality 20, 25 to use for each outgoing call.

The user designated mode of operation 40 enables the user to uniquely assign either the line 1 or line 2 telephone functionalities 20, 25 to an outgoing call number dialed into the telecommunications device 10. Upon entry of an outgoing call number through the user interface 45 of a telecommunications unit 10, a call number database 50 is accessed to determine which telephone line functionality to use with an entered outgoing call number. A search is made through the listing of outgoing call numbers 55 within the database 50. If the outgoing call number 55 is located, the number will have a telephone line number functionality 60 associated therewith instructing the telecommunications unit 10 which telephone line to utilize for the outgoing call. Thus, business outgoing call numbers would be associated with a business line while personal outgoing call numbers would be associated with a personal line. The entry of the telephone line number functionality 60 to utilize with an outgoing call number 55 in the database 50 is made through a user interfaced 45. The user interface 45 enables the user to either manually or electronically associate a particular telephone line functionality 60 with an out going call number 55.

The call number database 50 does not necessarily have to be a separate database within the telecommunications device 10, but instead, may be associated with an existing application within a telecommunication unit 10 such as phone book or speed-dial application. The existing application would only need to be modified such that whenever a record for a callee was created within the telecommunications device 10, the telephone line functionality 60 to which the call should be assigned is indicated with an entered telephone number. For example, when a list of names and telephone numbers is created based on a personalized telephone list, scanned in business card or on-line phone book, the user may merely attach telephone line functionality preference information to each telephone number. Alternatively, when a list of telephone numbers is created in a speed dial application, the user merely attaches the preference information to the entered telephone number. For large phone book applications, the user may utilize the user designated functionalities 40 to specify his telephone line functionality 60 preferences at the top level. For example, the user may specify that all telephone numbers not otherwise indicated to be associated with a particular telephone line functionality 60 are to be associated with one specific telephone line functionality.

Alternatively, when the telecommunications device 10 is operating in the user designated mode 40 and no preselected telephone line functionality has been designated, the telecommunications unit may provide, via the user interface 45 a display menu or some other type of indication to the user, choices of the telephone line functionalities 60 available after an outgoing call number has been entered. Once the user has entered a selection for the telephone line functionality 60 through the user interface 45, a telecommunication unit 10 completes the call using the indicated telephone line functionality.

Figure 2:
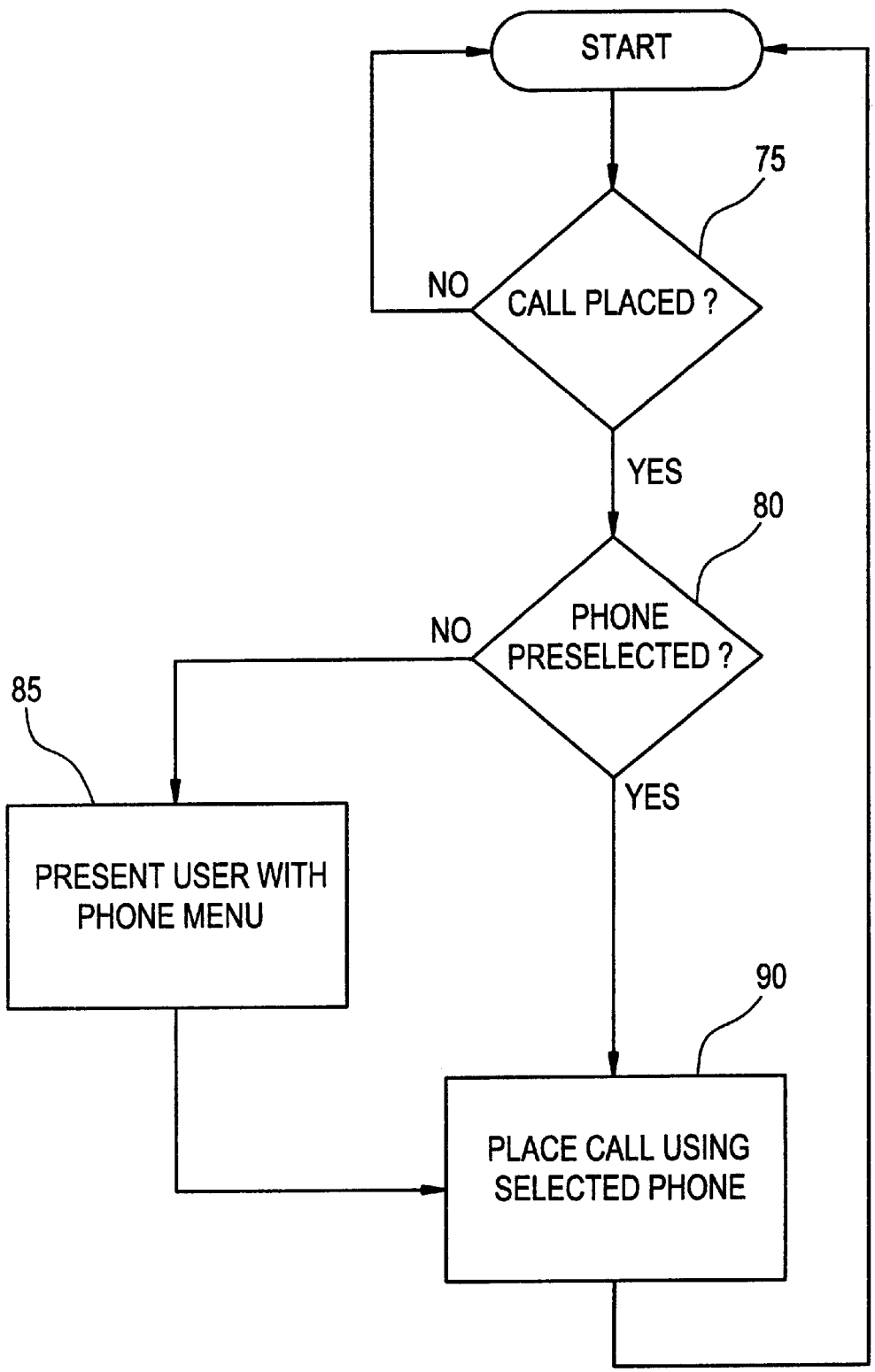
FIG. 2 is diagram illustrating the placing of a call according to the present invention.

Referring now to FIG. 2, there is illustrated a flow diagram illustrating an outgoing call according to the method of the present invention. Inquiry step 75 monitors for the placement of an outgoing call. Once an outgoing call is detected, inquiry step 80 determines whether a telephone line has been preselected to be associated with the outgoing call. If not, the user is presented with a listing of outgoing call functionalities for selection at step 85. At step 90, the call is placed using the selected telephone line functionality selected or preselected by the user by the user. Control then returns back to step 70.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A telecommunications device, comprising:
   a first interface for accessing a telecommunications network via a first telephone line;
   a second interface for accessing the telecommunications network via a second telephone line;
   a module for selecting, responsive to an entered outgoing call number and a user generated input, one of the first interface or the second interface to support a connection between the telecommunications device and the outgoing called number over the telecommunications network; and
   a second module for selecting between an automated mode of operation, wherein the first interface or the second interface are automatically randomly selected or a non-automated mode of operation, wherein the first module selects the first or second interface.

2. The telecommunication device of claim 1, wherein the module further comprises a database listing of outgoing call numbers having an indication of whether the first interface or the second interface should be used for calls to the outgoing call numbers associated therewith.

3. The telecommunications device of claim 1, wherein the module further directs all outgoing calls to a selected one of the first and second interfaces for accessing unless the user generated input indicates otherwise.

4. The telecommunications device of claim 1, wherein the module prompts a user for manual selection of the first interface or the second interface.

5. The telecommunications unit of claim 1, wherein the telecommunications network comprises a wireless network.

6. A telecommunications device, comprising:
   a first interface for accessing a telecommunication network;
   a second interface for accessing the telecommunication network;
   a database listing of outgoing call numbers each outgoing call number having associated therewith an indication of whether the first or second interface should be used for accessing the outgoing call number over the telecommunications network; and
   a module for selecting between an automatic mode of operation wherein the first or second interface are automatically selected for the outgoing call number and a non-automatic mode of operation wherein the database listing is used for selecting the first or second interface.

7. The telecommunications device of claim 6, wherein the database directs all outgoing calls to a selected one of the first and second means for accessing unless the user generated input indicates otherwise.

8. The telecommunications device of claim 6, further including means for prompting a user for manual selection of the first or second means for accessing.

9. The telecommunications unit of claim 6, wherein the telecommunications network comprises a wireless network.

10. A method for providing outgoing call service from a telecommunications device having a plurality of outgoing telephone lines to a telecommunications network, comprising the steps of:

entering an outgoing call number at the telecommunications device;

determining whether the telecommunications device is operating in an automatic mode of operation or a non-automatic mode of operation;

if the telecommunications device is in the automatic mode of operation, automatically and randomly selecting an outgoing telephone line for the outgoing call; and if the telecommunications device is in the non-automatic mode of operation, selecting an outgoing telephone line responsive to preselected calling criteria; and accessing the outgoing call number on the telecommunications network using the outgoing telephone line indicated by the user.

11. The method of claim 10, wherein the step of determining further comprises the steps of:

presenting the user with a selection of the plurality of telephone lines; and determining which of the presented selections has been selected by the user.

12. The method of claim 10, wherein the step of determining further comprises the steps of:

accessing a database having a listing of outgoing call numbers with associated outgoing telephone lines; and locating an outgoing phone line associated with the entered outgoing call number.

* * * * *